(12) United States Patent
Kristiansen et al.

(10) Patent No.: US 6,305,308 B1
(45) Date of Patent: Oct. 23, 2001

(54) DEFLECTOR WITH SHOCK ABSORBER

(76) Inventors: Ottar Kristiansen, Guldberglia 9G, N-0375 Oslo (NO); Arne Ramstad, Eikaslia 22, N-5131 Nyborg (NO)

( * ) Notice: Subject to any disclaimer, the term of this patent is extended or adjusted under 35 U.S.C. 154(b) by 0 days.

(21) Appl. No.: 09/581,686

(22) PCT Filed: Dec. 7, 1998

(86) PCT No.: PCT/IB98/01946

§ 371 Date: Jun. 15, 2000

§ 102(e) Date: Jun. 15, 2000

(87) PCT Pub. No.: WO99/33700

PCT Pub. Date: Jul. 8, 1999

(30) Foreign Application Priority Data

Dec. 23, 1997 (GB) .................................................. 9727228

(51) Int. Cl.[7] .............................. B63B 21/66; B63G 8/42
(52) U.S. Cl. ............................................................ 114/244
(58) Field of Search ................................... 114/244, 245, 114/247, 253

(56) References Cited

U.S. PATENT DOCUMENTS

| 3,570,441 | * | 3/1971 | Johnson et al. | 114/253 |
| 3,576,170 | * | 4/1971 | Bush | 114/253 |
| 3,793,623 | * | 2/1974 | Gongwer | 367/173 |
| 4,185,578 | * | 1/1980 | Reber | 114/245 |
| 5,357,892 | * | 10/1994 | Vatne et al. | 114/244 |

* cited by examiner

*Primary Examiner*—S. Joseph Morano
*Assistant Examiner*—Andrew Wright
(74) *Attorney, Agent, or Firm*—John H. Bouchard

(57) ABSTRACT

A deflector assembly of the kind used to pull one or more seismic streamers being towed by a seismic survey vessel out to a desired lateral offset from the vessel comprises a wing-shaped deflector body suspended by a cable or chain between a float. In order to prevent the cable or chain from breaking in rough weather, a shock absorber is included somewhere along its length, preferably with the deflector body or within the float. The shock absorber comprises a piston and cylinder assembly co-operating with a gas-filled accumulator acting as a spring.

8 Claims, 3 Drawing Sheets

DEFLECTOR WITH SHOCK ABSORBER

BACKGROUND OF THE INVENTION

This invention relates to an improved deflector device of the kind to be installed between a towing vessel and a tow located in water, for example, a streamer, a cable with seismic sources or a seismic source array. The purpose of the deflector is to pull the tow out to the side of the vessel, to position the towed seismic equipment at the desired lateral offset from the vessel.

One such device is described in U.S. Pat. No. 5,357,892. It comprises a wing-shaped deflector body which is positioned generally vertically in the water so as to be completely submerged in use. The deflector is suspended under a float and the tow, which follows the deflector, is suspended at the rear of the deflector wing. The deflector is connected to the towing vessel by means of a tow-line fixed to a point near the front of the deflector wing. The deflector wing is of aerofoil-like cross-section. As it is pulled through the water, a sideways force, or "lift", is exerted on the aerofoil-like wing, while the line to the float provides rolling stability.

The deflectors in current use are very large, typically, 7.5 m high by 2.5 m wide and weigh several tonnes. They are usually suspended around 28 m below the float by means of a fibre rope, and are also provided with a safety chain intended to prevent separation, of the float and deflector wing in the event that the rope breaks.

In bad weather, the upper part of the deflector wing may rise up out of the water, allowing the rope connecting the deflector wing and the float to go slack. If the deflector wing then drops abruptly, the rope, and, possibly, the safety chain, may break or the attachment points may be damaged. it is an object of the present invention to alleviate this problem.

SUMMARY OF THE INVENTION

In accordance with the invention, there is provided a deflector assembly for installing in a tow-line between a towing vessel and a tow in the water behind the vessel, the deflector assembly comprising: a deflector body so shaped and coupled to the towing vessel and to said tow, respectively, as to urge the tow laterally with respect to the direction of movement of the towing vessel; and a float from which the deflector body is suspended; wherein the connection between the float and the deflector body includes shock absorber means for reducing the likelihood of said connection breaking in the event that the deflector body moves abruptly away from the float.

Preferably, the shock absorber means are disposed within the outer profile of the deflector body or float so as to avoid a substantial increase in drag due to the presence of the shock absorber means.

BRIEF DESCRIPTION OF THE DRAWINGS

An embodiment of a deflector assembly in accordance with the invention will now be described in detail, by way of example only, with reference to the accompanying drawings, in which.

DESCRIPTION OF THE PREFERRED EMBODIMENT

Figure 1:
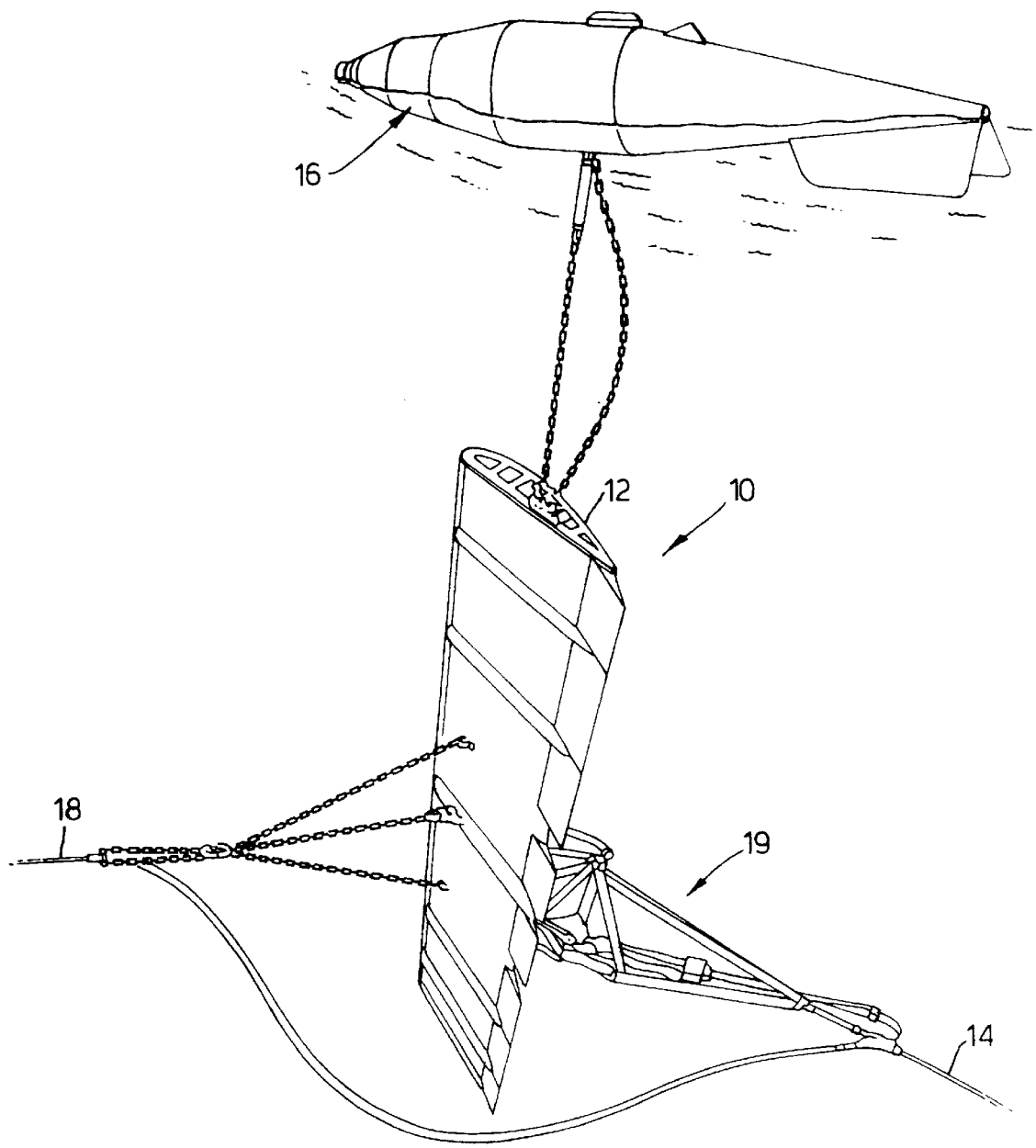
FIG. 1 is a schematic perspective view of a deflector assembly.

The deflector assembly 10 shown in FIG. 1 is mounted between a towing vessel (not shown) and a tow 14 in the water behind the vessel. The tow may comprise seismic streamers, a cable with seismic sources or other equipment.

The deflector assembly 10 shown in FIG. 1 is mounted between a towing vessel (not shown) and a tow 14 in the water behind the vessel. The tow may comprise seismic streamers, a cable with seismic sources or other equipment.

The deflector assembly 10 comprises a deflector body 12 of aerofoil-like cross-section which is suspended generally vertically beneath a float 16. The tow 14 is connected to the deflector body-12 at its rear, trailing edge. The whole deflector assembly 10 is connected to the towing vessel by means of a towline 18 fastened to the deflector body 12 close to its forward edge. A control system 19 is provided to allow the angle of inclination of the deflector body 12, and, hence, the lateral force, to be adjusted as described in more detail in U.S. Pat. No. 5,357,892.

Figure 2:
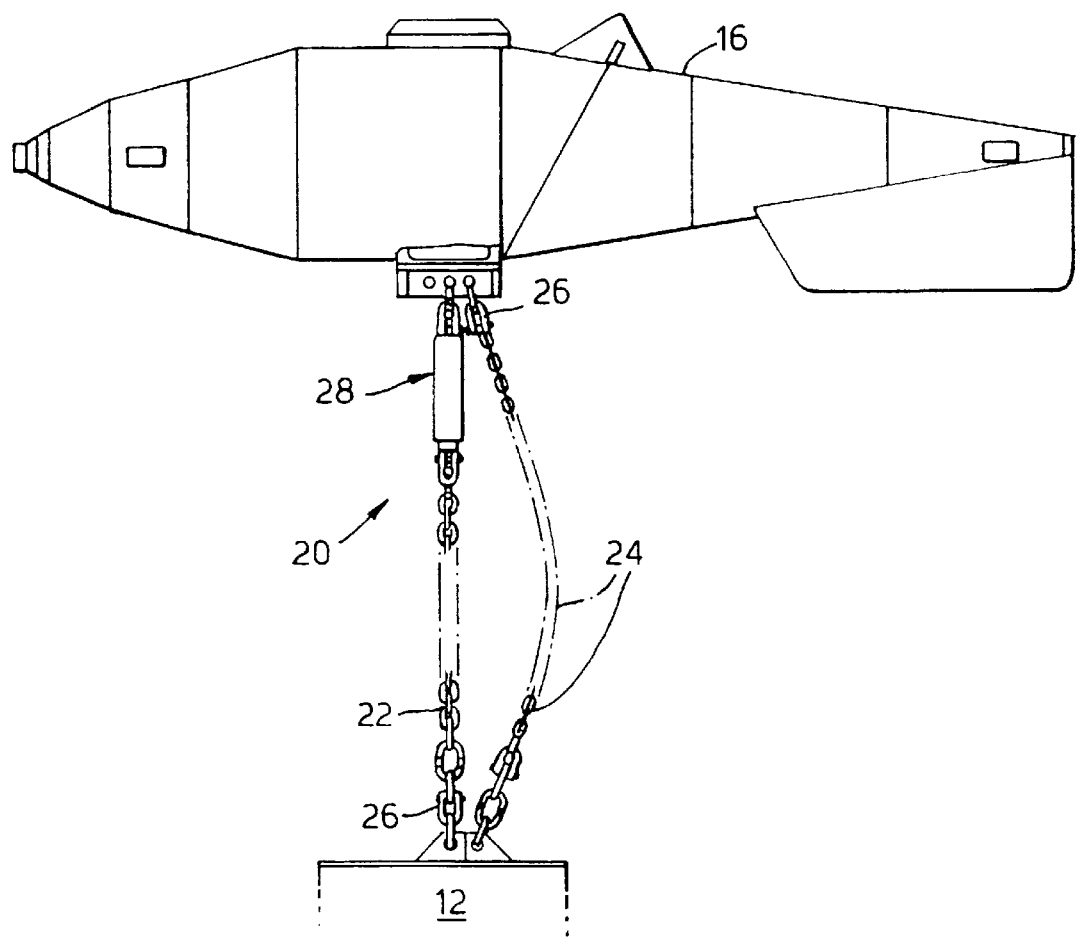
FIG. 2 is a side view of the float harness arrangement of a first deflector assembly in accordance with the invention.

The harness 20 by means of which the deflector body 12 is suspended beneath the float 16 is shown in greater detail in FIG. 2.

The harness 20 includes a main cable or, as shown, chain 22 and a longer safety chain 24, both of which are secured to the float 16 and to the deflector body 12 by means of suitable shackles 26. A shock absorber 2B is included in the main chain 22 at some point, preferably immediately adjacent either the deflector body 12 or, as shown, the float 16, in order to minimise the number of fixings required.

Figure 3:
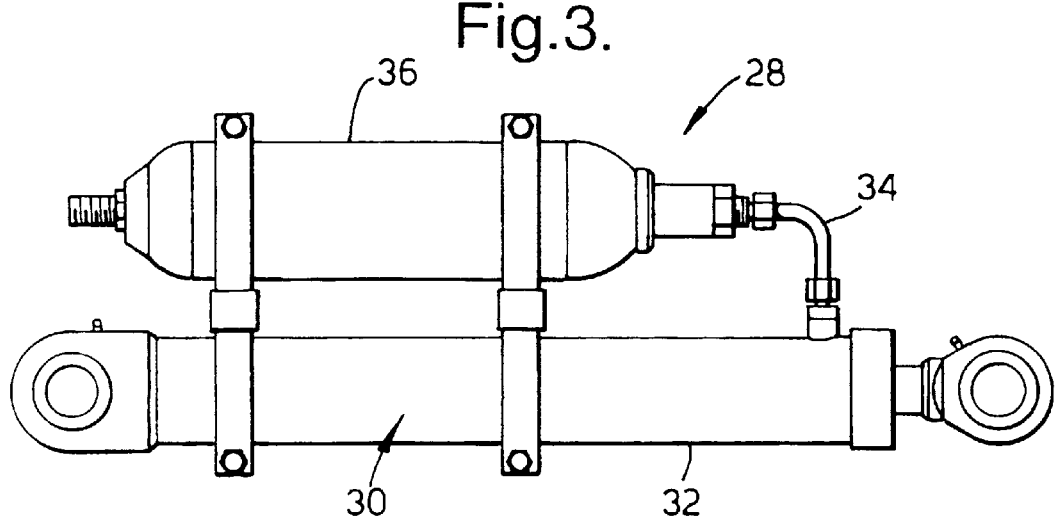
FIG. 3 is side view of the shock absorber of the deflector assembly of FIG. 2.
Figure 4:
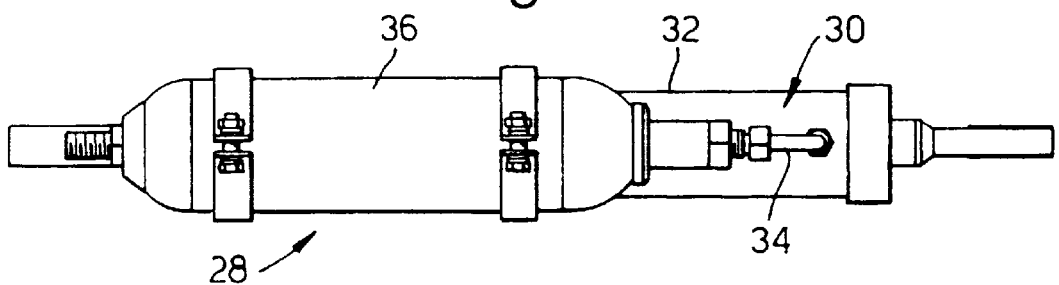
FIG. 4 is a top view of the shock absorber of FIG. 3.

The shock absorber 28 shown in FIGS. 3 and 4 includes a piston-and cylinder assembly 30. The cylinder 32 is filled with hydraulic fluid and, if the main chain 22 is subject to a sudden force, the piston moves within the cylinder 32, forcing hydraulic fluid out of the cylinder through an outlet pipe 34. The outlet pipe 34 leads to an accumulator 36 filled with nitrogen. The nitrogen resists compression and acts in a manner similar to a spring, thus absorbing some of the force exerted on the main chain 22 by which the deflector body 12 is suspended beneath the float 16 and reducing the likelihood of it snapping under the sudden force exerted as the deflector body 12 drops.

The shock absorber 28 not only reduces the likelihood of the main chain 22 snapping, but generally increases the fatigue life of the chain 22 and the associated shackles and other parts.

Figure 5:
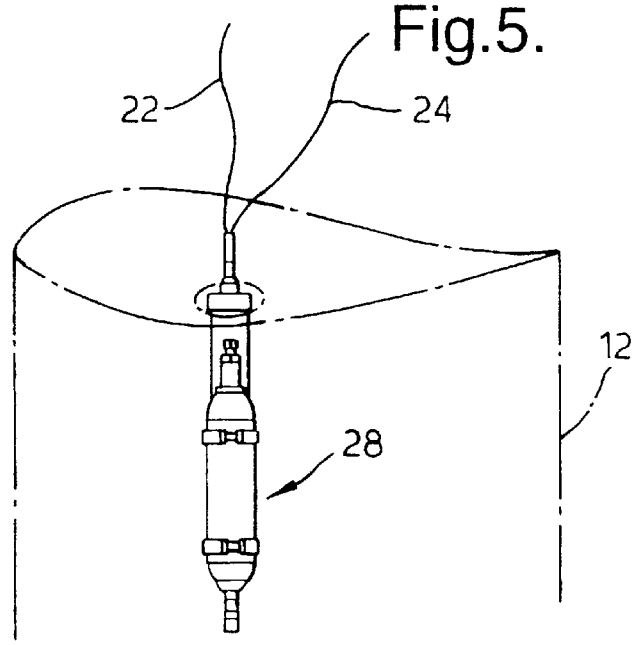
FIG. 5 shows a further, preferred deflector assembly in accordance with the invention.

As shown in FIG. 2, the shock absorber 28 is mounted in the chain or cable 22 outside both the body of the float 16 and the deflector body 12. This has the effect of increasing the drag due to the main cable shock absorber, which is clearly undesirable. It is to be preferred, therefore, to mount the shock absorber 28 as shown in FIG. 5, within the overall profile of the deflector body 12, where it has little effect on the drag of the deflector assembly. The same result can be achieved by mounting the shock absorber within the body of the float 16.

It will be appreciated that many modifications can be made to the described embodiments of the invention. in particular, the pipe 34 may be formed within a single cast block into which the respective interconnected ends of the cylinder 32 and the accumulator 36 are fitted. Alternatively, in place of the shock absorber 28 described above, any other suitable shock-absorbing arrangement, for example based on one or more mechanical springs, can be used to reduce the likelihood of the main chain or cable tethering the deflector body 12 beneath the float 16 breaking under a sudden force.

What is claimed is:

1. A deflector assembly adapted to be mounted for interconnection between a tow vessel adapted to move through a water medium and a tow, said tow being towed by said vessel when said tow vessel is moving through said water medium, said deflector assembly comprising:
   a deflector body, said body being shaped in a particular shape and being coupled between the tow vessel and the tow in a particular manner, the particular shape and the particular manner being chosen such that the tow is urged laterally with respect to a direction of movement of the tow vessel when said tow vessel is towing said tow;
   a float adapted to float on a surface of said water medium;
   an interconnection system adapted for interconnecting said float to said deflector body, said deflector body being suspended by said interconnection system from said float when said deflector body is coupled between said tow vessel and said tow and said tow vessel is towing said tow through said water medium; and
   a shock absorber physically located within said float and responsive to a rapid movement of said deflector body away from said float adapted for reducing said rapid movement of said deflector body away from said float thereby preventing said deflector body from breaking away from said float in response to said rapid movement,
   wherein the physical location of said shock absorber within said float substantially reduces any drag effect on said deflector body when said deflector body is being towed by said tow vessel through said water medium.

2. The deflector assembly of claim 1, wherein said shock absorber comprises:
   a cylinder containing a piston and hydraulic fluid, and
   an accumulator connected to said cylinder, said accumulator containing a gas,
   said piston moving in said cylinder responsive to said rapid movement of said deflector body away from said float thereby forcing said hydraulic fluid into said accumulator, said gas in said accumulator, responsive thereto, functioning as a spring for absorbing some of a force which is produced during said rapid movement of said deflector body away from said float.

3. A towing system adapted to be towed behind a tow vessel when said tow vessel is moving through a water medium, comprising:
   a deflector assembly adapted to be connected behind said tow vessel, said deflector assembly moving through said water medium when said deflector assembly is connected behind said tow vessel and said tow vessel is moving through said water medium;
   a float adapted to move on a surface of said water medium in synchronism with the movement of said deflector assembly through said water medium when said deflector assembly is connected behind said tow vessel and said tow vessel is moving through said water medium,
   an interconnection system adapted for interconnecting said deflector assembly to said float, said deflector assembly being suspended beneath said float in said water medium, said float including and physically enclosing a shock absorber system adapted for absorbing any sudden shock which is produced along said interconnection system between said float and said deflector assembly,
   the enclosure of said shock absorber system within the physical confines of said float substantially reducing any drag on said deflector assembly which is produced when said tow vessel is moving through said water medium and said tow vessel is towing said defector assembly through said water medium.

4. The towing system of claim 3, further comprising a tow connected to said deflector assembly, said deflector assembly being interconnected between said tow vessel and said tow, and wherein said deflector assembly comprises a deflector body, said deflector body being shaped in a particular shape and being coupled between said tow vessel and said tow in a particular manner, said particular shape and said particular manner being chosen such that said tow is urged laterally with respect to a direction of movement of said tow vessel when said tow vessel is towing said tow.

5. The towing system of claim 4, wherein said shock absorber system enclosed by said float comprises:
   a cylinder containing a piston and hydraulic fluid, and
   an accumulator connected to said cylinder, said accumulator containing a gas,
   said piston moving in said cylinder responsive to a rapid movement of said deflector assembly away from said float thereby forcing said hydraulic fluid into said accumulator, said gas in said accumulator, responsive thereto, functioning as a spring for absorbing some of a force which is produced during said rapid movement of said deflector assembly away from said float.

6. A system adapted to be towed by a tow vessel on and within a water medium, comprising:
   a deflector assembly connected to said tow vessel and adapted to be towed by said tow vessel within said water medium;
   a float having a physical enclosure, connected to said deflector assembly, adapted to be disposed on a surface of said water medium, and adapted to be towed on said water medium, said float being towed along said surface when said deflector assembly is towed by said tow vessel;
   an interconnection system interconnecting said deflector assembly to said float; and
   a shock absorber disposed and enclosed within said physical enclosure of said float, said shock absorber being adapted to absorb any sudden forces which exist along said interconnection system when said deflector assembly moves suddenly away from said float,
   the enclosure of said shock absorber within said physical enclosure of said float substantially reducing any drag which exists on said deflector assembly when said deflector assembly is being towed by said tow vessel within said water medium.

7. The system of claim 6, wherein said shock absorber enclosed by said float comprises:
   a cylinder containing a piston and hydraulic fluid, and
   an accumulator connected to said cylinder, said accumulator containing a gas,
   said piston moving in said cylinder responsive to a rapid movement of said deflector assembly away from said float thereby forcing said hydraulic fluid into said accumulator, said gas in said accumulator, responsive thereto, functioning as a spring for absorbing some of a force which is produced during said rapid movement of said deflector assembly away from said float.

8. The system of claim 7, further comprising a tow connected to said deflector assembly, said deflector assembly being interconnected between said tow vessel and said tow, and wherein said deflector assembly comprises a deflector body, said deflector body being shaped in a particular shape and being coupled between said tow vessel and said tow in a particular manner, said particular shape and said particular manner being chosen such that said tow is urged laterally with respect to a direction of movement of said tow vessel when said tow vessel is towing said tow.

* * * * *